No. 675,208. Patented May 28, 1901.
H. H. GERHARDT.
TRUSS.
(Application filed Sept. 29, 1900.)
(No Model.)
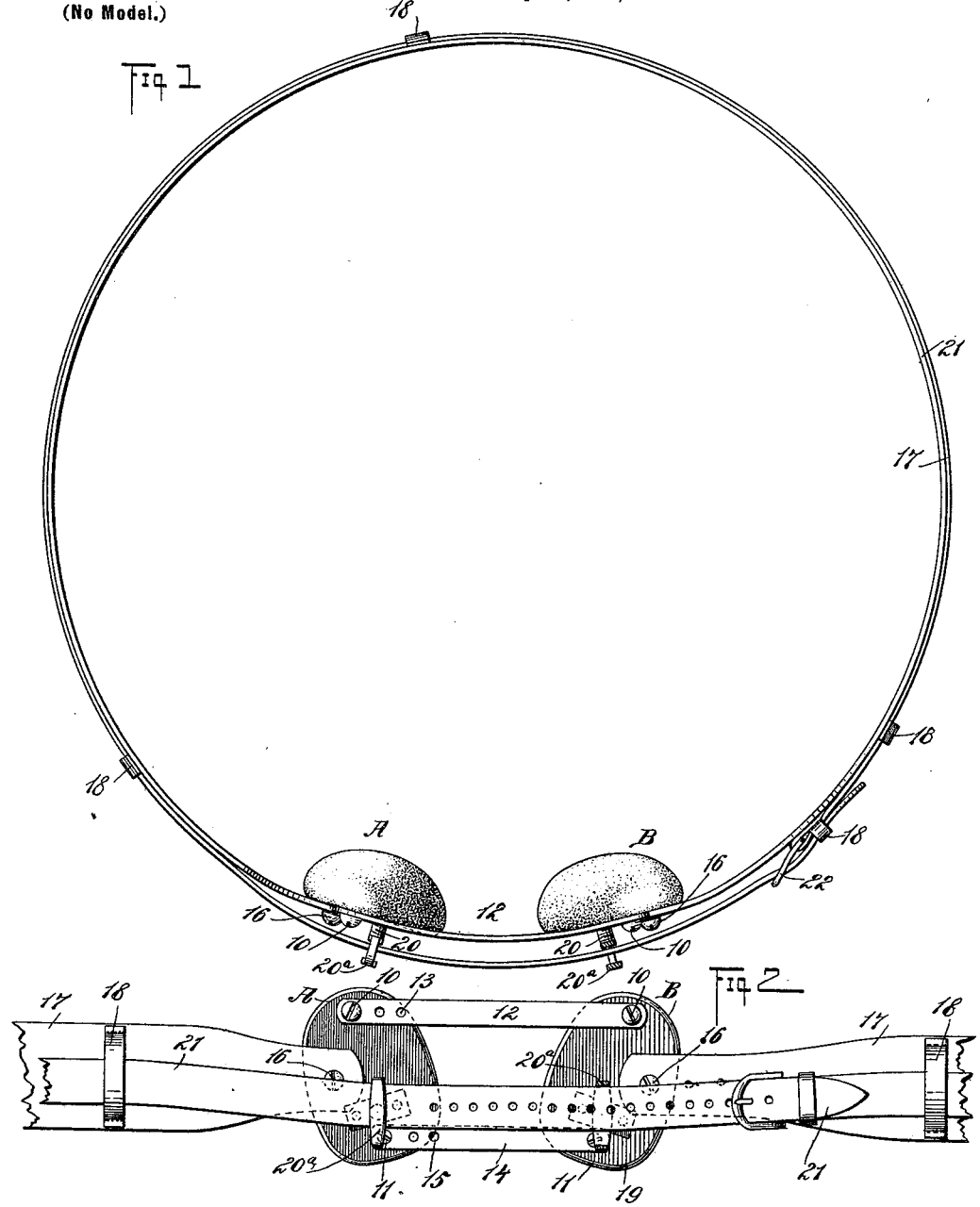
WITNESSES:
INVENTOR
Henry H. Gerhardt.
BY
ATTORNEYS

UNITED STATES PATENT OFFICE.

HENRY HOBBS GERHARDT, OF NASHVILLE, TENNESSEE.

TRUSS.

SPECIFICATION forming part of Letters Patent No. 675,208, dated May 28, 1901.

Application filed September 29, 1900. Serial No. 31,512. (No model.)

*To all whom it may concern:*

Be it known that I, HENRY HOBBS GERHARDT, a citizen of the United States, and a resident of Nashville, in the county of Davidson and State of Tennessee, have invented a new and Improved Truss, of which the following is a full, clear, and exact description.

One purpose of the invention is to so construct a truss that the pads or supports may be adjusted vertically and laterally to and from each other and also adjusted to and from the person to increase or to diminish the pressure of the pads on the person, each pad being capable of independent adjustment.

Another purpose of the invention is to provide a body-belt with which the pads or supports are connected and an auxiliary belt working freely upon the body-belt and adapted to hold the body-belt in position and prevent the adjustment of the pads to and from the body from being disturbed.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved truss in its entirety. Fig. 2 is a front elevation of the front portion of the truss, and Fig. 3 is a vertical section through one of the pads and the adjusting device through the medium of which the pad is carried to and from the body.

A and B represent the two pads or supports which are incident to a truss, and these pads or supports may be made of any suitable or approved material and may be of the usual form. Each of the pads or supports at its outer face is provided near the top with a centrally-located screw 10 or its equivalent, and a similar screw 11 is located near the center of the bottom portion of each of the said pads or supports. A strap 12 connects the upper end portions of the two supports or pads, and a strap 14 performs the same service at the bottom portions of said pads or supports. The upper strap 12, connecting the pads or supports, is attached at one end to one of the pads by means of a screw 10 and is likewise secured to the opposite pad by a corresponding screw 10; but at one end of the connecting-strap 12 a series of apertures 13 is produced, so that the pads or supports may be drawn closer together or placed in position as far apart as may be desired. The lower strap 14 is likewise connected at one end to one of the pads or supports by means of a screw 11 and at its opposite end is provided with a series of apertures 15, through one of which the screw 11 of the opposite pad or support is passed, and in this manner the pads or supports may be adjusted to or from each other as conditions may require.

Outside of a vertical line drawn through the center of the screws 10 and 11 of each pad or support a screw 16 is located, and these screws 16 are adapted to normally receive and to fasten the ends of a belt 17 to the pads or supports A and B. This belt 17 may be made of any desired material and may be of any suitable width and is provided with loops 18 on its outer face at desired intervals apart. A nut 19 is secured over an aperture 19$^a$ at the outer face of each of the pads or supports A and B at its central portion, but nearer the bottom of the pads or supports than the top, as is illustrated in Fig. 3. Each of the nuts 19 receives an adjusting-screw 20, the head 20$^a$ of which is provided with an opening from one side to the other, and through these openings in the heads 20$^a$ of the adjusting-screws 20 an end of an outside adjusting-strap 21 is passed, and this end of the adjusting-strap is adapted to engage with a suitable buckle 22, located upon the opposite end of the said adjusting-strap. The adjusting-strap 21 is passed through the loops 18 on the body strap or belt 17 and is thus guided along the length of said body strap or belt, and when the adjusting-strap is tightened up at the front of the truss the pressure of the body-strap will be equalized throughout its length.

It will be observed that the pads or supports A and B are adjustable vertically independent of each other—as, for example, the upper or the lower strap 12 and 14 may be attached to the said pads or supports through the medium of the central screws 16, or the ends of the body-belt 17 may be attached to the pads or supports at the upper screws or fastening devices 10 or the lower screws or fastening devices 11—and it will be further observed that an adjustment of the said pads or supports may be independently made to or from the body of the wearer by screwing in or out the adjusting-screws 20 and that when the outer or tension belt 21 is passed through the openings in the heads of the set-screws 20 they will be held in their set positions.

One of the main advantages of the improved truss is that either the pad A or B may rise and fall independent of the other—as, for instance, in riding a bicycle or in mounting a horse one pad will automatically move up and the other down without either of them being moved from their place on the body. In fact, the pads accommodate themselves to the movements of the body without danger of displacement.

Having thus described my invention, I claim as new and desire to secure by Letters Patent—

1. A belt, truss-pads connected at the end portions of the said belt, adjustable connections between the truss-pads, adjusting devices for regulating the pressure of the pads upon the body of the wearer, and an auxiliary belt arranged to engage the adjusting devices to hold them in their set position.

2. A belt, pads adjustably attached to said belt, an adjusting-screw for each pad to adjust the pads to and from the body of the wearer, the said screws being each provided with a head having an opening extending from one side to the other, and an adjusting-strap engaging the belt and extending through the openings in the heads of the adjusting-screws, for the purpose set forth.

3. A belt, pads adjustably attached to the end portions of said belt, adjustable connections between the said pads at their top and bottom portions, an adjusting-screw located at the outer face of each pad, adapted to regulate the pressure of the pads upon the body of the wearer, said regulating-screws being provided with loops at their outer portions, and an auxiliary belt extending along the outer surface of the main belt, which auxiliary belt is passed through the loop portions of said adjusting-screws, for the purpose set forth.

4. In a truss, a main belt, pads pivotally and removably attached near their outer edges to the ends of the belt, a strap adjustably connecting the upper portions of said pads, a second strap adjustably connecting the lower portions of said pads, an auxiliary belt having guided engagement with the main belt, and crossing the space between the end portions of the main belt, and adjusting devices for regulating the pressure of the pads upon the body of the wearer, said adjusting devices being engaged by the said auxiliary belt, for the purpose set forth.

5. In a truss, the combination, with a main belt and pads removably attached to the ends of said main belt, the attachment between the pads and main belt being eccentrically of the pads and near their outer edges, of straps adjustably connecting the upper and the lower portions of the pads, said straps being in engagement with the outer surface of the pads, set-screws located upon the outer faces of the pads at a point below their centers, each set-screw having an apertured head, an auxiliary belt following the main belt, and in engagement therewith, said auxiliary belt being passed through the apertured heads of the adjusting-screws, and guides for the auxiliary belt carried by the main belt, as specified.

6. In a truss, the combination with a pad, of a belt attached thereto, an adjusting-screw for the pad having an apertured head, and an auxiliary strap or belt engaging the main belt and passing through the apertured head of the adjusting-screw, as set forth.

7. In a truss, the combination with a belt, truss-pads, and an upper and a lower strap for connecting the pads, of means located on the outer face of each pad for pivotally connecting the pads with the straps and belt, and permitting of the adjustment of the pads vertically independent of each other, the said straps being adjustably connected with the pivotal screws whereby the pads may be moved to or from each other, and means for adjusting the pads to or from the body of the wearer and means for holding said screws in the adjusted position, for the purpose set forth.

In testimony whereof I have signed my name to this specification in the presence of two subscribing witnesses.

HENRY HOBBS GERHARDT.

Witnesses:
ED. D. FISHER,
SANDFORD DUNCAN.